United States Patent
Oshima et al.

[15] 3,671,506
[45] June 20, 1972

[54] SULFUR CURABLE COPOLYMERS OF OLEFINS

[72] Inventors: Teruo Oshima, Nishinomiya-shi; Takeshi Wada, Takatsuki-shi; Tsuneyuki Nagase, Takatsuki-shi; Fujio Masuko, Takatsuki-shi; Masaaki Hirooka, Ibaragi-shi; Isoji Taniguchi, Toyonaka-shi, all of Japan

[73] Assignee: Sumitomo Chemical Company, Ltd., Osaka, Japan

[22] Filed: Feb. 4, 1969

[21] Appl. No.: 796,610

[30] Foreign Application Priority Data

Feb. 8, 1968 Japan..........................43/8057

[52] U.S. Cl..................260/80.78, 260/666 PY
[51] Int. Cl. ...............................C08f 19/00
[58] Field of Search..............260/80.78, 88.2 D, 666

[56] References Cited

UNITED STATES PATENTS

| | | | |
|---|---|---|---|
| 3,167,595 | 1/1965 | Heywood | 260/666 |
| 3,297,626 | 1/1967 | Smith | 260/41.5 |
| 3,345,419 | 10/1967 | Tinsley | 260/617 |
| 3,350,370 | 10/1967 | Keller | 260/80.78 |
| 3,489,733 | 1/1970 | Natta | 260/80.78 |
| 3,435,058 | 3/1969 | Rinehart | 260/429 |
| 3,513,447 | 9/1970 | Gumboldt | 260/80.78 |

OTHER PUBLICATIONS

Moen, R. V. and Makowski, H. S. Determination of 2-Substituted-5-Norbornenes by Nuclear Magnetic Resonance Spectrometry, Analytical Chemistry 39 (14) 1860– 1862, 1967

*Primary Examiner*—Joseph L. Schofer
*Assistant Examiner*—Roger S. Benjamin
*Attorney*—Stevens, Davis, Miller & Mosher

[57] ABSTRACT

A linear copolymer having a high sulfur curing rates is prepared by contacting substantially exo-type 5-alkenyl-2-norbornene compound and ethylene and/or α-olefin having three to 20 carbon atoms with a catalyst consisting essentially of an organoaluminum compound and vanadium compound and/or titanium compound, both said vanadium compound and titanium compound having at least trivalencies, in the presence or absence of an inactive reaction medium. Particularly, terpolymers comprising ethylene, propylene and substantially exo-type 5-alkenyl-2-norbornene have excellent characteristics as elastomers.

12 Claims, No Drawings

SULFUR CURABLE COPOLYMERS OF OLEFINS

This invention relates to a copolymer of exo-type alkenylnorbornene compound and olefins and a method for preparing the same, and more particularly a method for preparing an amorphous linear terpolymer of ethylene, α-olefin, and exo-type 5-alkenyl-2-norbornene, and a method for preparing the same.

In order to make possible sulfur vulcanization of amorphous copolymer of ethylene and α-olefin, particularly propylene, methods for preparing a terpolymer by adding various diene compounds thereto have been heretofore proposed. Particularly, norbornene compounds have been widely used as a diene compound excellent in copolymerizability. However, in sulfur-vulcanizing the thus obtained copolymers, satisfactory vulcanization effects have not always been obtained.

It is highly desirable to obtain a copolymer having an excellent sulfur curing rate, but the sulfur curing rates even of the norbornene are greatly different, depending upon the chemical structures of residual double bond.

The diene or polyene compounds of norbornene derivatives used for such a purpose are obtained by condensing the corresponding dienes or polyenes and cyclopentadiene according to Diels-Alder reaction.

However, in many Diels-Alder reactions for such similar diene groups, norbornene compounds having endorich-type side chains are obtained.

In these reactions for such similar diene groups, condensation of dienes of the same species often takes place, and thus such is not always a suitable method for obtaining pure diene compounds of norbornene. On the other hand, it is possible to synthesize a norbornene having an exo-type alkenyl group by dehydrating the corresponding norbornene alcohol. For example, an exo-type isopropenylnorbornene can be readily prepared by dehydrating exo-1',1'-dimethyl-5-norbornene-2-methanol or a mixture of endo-and exo-1',1'-dimethyl-5-norbornene-2-methanol.

The present inventors have studied sulfur curing rate of copolymers obtained by copolymerizing norbornene derivatives prepared according to said method, and as a result have found that norbornene compounds having exo-type alkenyl groups have a considerably higher curing rate than the corresponding endo-type compounds and established the present invention.

Accordingly, one object of the present invention is to provide a copolymer having a high vulcanizing rate.

Another object is to provide a method for preparing such copolymer.

Other objects will be apparent from the following description.

In order to accomplish these objects, the present invention provides a linear copolymer consisting of substantially exo-type 5-alkenyl-2-norbornene and at least one member selected from the group consisting of ethylene and α-olefin having three to 20 carbon atoms. Further the present invention provides a method for preparing a copolymer, which comprises contacting substantially exo-type 5-alkenyl-2-norbornene compound and at least one member selected from the group consisting of ethylene and α-olefin having three to 20 carbon atoms with a catalyst consisting essentially of (1) an organoaluminum compound having a general formula, $AlR_nX_{3-BHn}$, wherein R represents an ordinary hydrocarbon residual group, X represents a halogen atom and n represents a number from 1 to 3, and (2) at least one member selected from the group consisting of vanadium compounds and titanium compounds, both said vanadium compounds and titanium compounds having at least trivalencies.

In the present invention, substantially exo-type 5-alkenyl-2-norbornene derivatives having 1'- or 2'-alkenyl group are effectively used, and it is not necessary that the alkenyl group be linear. For example, the alkenyl groups include vinyl, isopropenyl, 1'-propenyl, allyl, 1'-butenyl, 2'-butenyl, 1'-hexenyl, 1'-octenyl, 1'-(2'-ethyl)-hexenyl, 1',4'-hexadienyl, and 1'-(6'-phenyl)-hexenyl. The norbornene having a substituent group at other position of the norbornene nucleus can be likewise used in the present invention. Accordingly, examples of the exo-type 5-alkenyl-2-norbornenes usable in the present invention include exo-type 5-isopropenyl-2-norbornene, exo-type 5-isopropenyl-6-methyl-2-norbornene, exo-type 5-vinyl-2-norbornene, exo-type 5-allyl-2-norbornene, exo-type 5-(1'-propenyl)-2-norbornene, and exo-type 5-(1'-butenyl)-2-norbornene. Particularly, 1'-alkenyl compounds are more effective in the present invention.

The α-olefin having three to 20 carbon atoms used in the present invention is represented by the general formula, $CH_2=CHR'$, wherein R' represents a hydrocarbon group having one to 18 carbon atoms, and an alkyl group is particularly preferable as R'. These α-olefins include propylene, butene-1, pentene-1, 3-methyl-butene-1, hexene-1, 3-methyl-pentene-1, 4-methyl-pentene-1, heptene-1, 4-methyl-hexene-1, 5-methyl-hexene-1, 4,4-dimethyl-pentene-1, octene-1, 4-ethyl-hexene-1, 4-methyl-heptene-1, 5-methyl-heptene-1, 4,4-dimethyl-hexene-1, 6-methyl-heptene-1, 5,6,6-trimethyl-heptene-1, decene-1, 2-ethyl-hexene-1, vinylcyclopentane, and vinylcyclohexane. Among these α-olefins, particularly propylene, butene-1 and other lower alkenes are advantageously used in the present invention.

With regard to an organoaluminum compound having said general formula, $AlR_nX_{3-n}$, it is preferable that R is an alkyl, alkenyl, aryl, aralkyl, alkylaryl, or cycloalkyl group, for example, methyl, ethyl, propyl, butyl, hexyl, octyl, decyl, dodecyl, stearyl, phenyl, toluyl, naphthyl, benzyl, cyclopentadienyl, cyclohexyl or the group having a group derived from the above-enumerated groups. The organoaluminum compounds include methylaluminum dichloride, ethylaluminum dichloride, isobutylaluminum dichloride, ethylaminum dibromide, allylaluminum dichloride, vinylaluminum dichloride, ethylaluminum sesquichloride, methylaluminum sesquichloride, methylaluminum sesquibromide, ethylaluminum sesquiiodide, isobutylaluminum sesquichloride, hexylaluminum sesquichloride, cyclohexylaluminum sesquichloride, diethylaluminum chloride, diethylaluminum bromide, dipropylaluminum chloride, didodecylaluminum chloride, diethylaluminum fluoride, ethylphenylaluminum chloride trimethylaluminum, triethylaluminum, tripropylaluminum, triisobutylaluminum, trihexylaluminum, tridecylaluminum, etc. or a mixture of the above-enumerated compounds or a mixture of the above-enumerated compound with aluminum halide so long as the mixture meets said general formula.

It is preferable that the vanadium or titanium compound used in the present invention as another essential component of the catalyst is a compound having a trivalency or higher valency and having at least one group selected from a halogen, alkoxy, acylacetonyl and cyclopentadienyl compounds. These compounds include vanadium tetrachloride, vanadium trichloride, vanadyl trichloride, vanadyl tribromide, vanadyl dichloride, vanadium triacetylacetonate, vanadyl chloride, diacetylacetonate, vanadyl dichloride monoacetylacetonate, vanadyl diacetylacetonate, vanadyl bisbenzoylacetonate, dicyclopentadienylvanadium dichloride, triethyl orthovanadate, di-n-butyoxyvanadyl chloride, ethoxyvanadyl dichloride, n-butyoxyvanadyl dichloride, n-hexyloxyvanadyl dichloride, cyclohexyloxyvanadyl dichloride, titanium tetrachloride, titanium trichloride, dicyclopentadienyltitanium dichloride, di-n-butoxytitanium dichloride, isopropoxytitanium trichloride, orthotitanic acid tetraethyl ester and bis[titanium tris-acetylacetonate] hexachlorotitanium.

Further, other vanadium or titanium compound capable of forming a coordination catalyst with the above-mentioned organoaluminum compound, for example, organic acid salt of vanadium, vanadium phosphate or vanadium salicylate can be used in the present invention. A mixture of said vanadium compound and said titanium compound can be also used in the present invention. Any other suitable compounds can be added to said catalyst system as the third component in the present invention, if required. These compounds include electron-donative compounds capable of forming a coordination compound with the organoaluminum compound or with at least one member selected from the group consisting of vanadium compounds and titanium compounds or having other charge transfer interactions, for example, amines, cyclic nitrogen compounds, acid amides, ethers, esters, ketones, aldehydes, compounds of such group Vb elements of Periodic Table as phosphorus, arsenic, antimony, and bismuth, or various chelating agents. Furthermore, these compounds include various oxidative compounds that are considered to have an effect upon prevention of the vanadium compounds or titanium compounds from excessive reduction by the organoaluminum compounds, for example, halogen, sulfur, metal halides, oxygen, nitro compounds, nitroso compounds, organic nitrates, nitrites, N-oxide compounds, P-oxide compounds, azo compounds, organic sulfides, disulfides, quinones, acid halides, etc. Furthermore, these compounds can include reagents having a suitable function of controlling a molecular weight, for example, hydrogen.

Though there is no specific limitation to ratio of organoaluminum compound to at least one member selected from the group consisting of vanadium compound and titanium compound used in the present invention, a favorable result can be obtained at a ratio by mole of 1:1 through 10,000:1, particularly 2:1 through 300:1. In terms of concentrations in a reaction mixture, the frequently employed concentration of at least one member selected from the group consisting of vanadium compounds and titanium compounds is 0.01 to 50 millimoles/liter, particularly 0.1 to 5 millimoles/liter. However, an excellent activity can be sometimes exhibited even in such a low concentration of less than 0.01 millimole/liter, for example, about $10^{-4}$ millimole/liter, depending upon a situation. The frequently employed concentration of the organoaluminum compound in the reaction mixture is 0.1 to 100 millimoles/liter, particularly 1 to 20 millimoles/liter.

Further, the frequently employed concentration of the norbornene compound in the reaction mixture is 0.1 to 1,000 millimoles/liter, particularly 5 to 100 millimoles/liter.

In a viewpoint of the species of organoaluminum compound, an organoaluminum compound containing halogen can give a particularly more preferable result than a trialkylaluminum compound. Further, among the organoaluminum compounds containing halogen, dialkylaluminum halide and alkylaluminum sesquihalide are particularly preferable. If, for example, benzenesulfonyl chloride is added to the catalyst system as the third compound even in the case alkylaluminum dihalide is used, an excellent activity can be obtained even in a vanadium compound concentration one-hundredth or much less lower than that in other ordinary catalyst system.

There is no specific limitation to order of adding the catalyst components and monomers and then can be added to the polymerization system in any manner. Generally speaking, a higher catalytic activity can be obtained when each catalyst component is added to the polymerization system in the presence of monomers than when a mixture of the catalyst components prepared previously is added to the polymerization system. However, in a viewpoint of the change with time in activity of the catalyst, better result can be sometimes obtained when a mixture of the catalyst components prepared in advance is used.

The monomer components, particularly norbornene compound, may be dissolved in the reaction medium previously, or may be continuously or intermittently added to the polymerization system together with other monomers at the same time. Ratio of ethylene to α-olefin depends upon desired properties of the copolymer. The preferred composition as an elastomer is 90–40 mole percent ethylene and 10–60 mole percent propylene and 0.1–20 mol % exo-type 5-alkenyl-2-norbornene. In an ethylene-rich case, crystalline copolymer can be more readily formed in general. In order to prepare an amorphous elastomer, which is one of the object of the present invention, it is necessary to avoid such excessively ethylene-rich conditions. Accordingly, it is preferable to feed, for example, not more than 85 percent by mole of ethylene to the polymerization system.

The polymerization reaction can be carried out under any pressure, for example, from a vacuum condition, or a condition diluted with other inactive gas, to a pressure condition up to 100 kg/cm². Any polymerization temperature, for example, from such a low temperature as −75° C. to such an elevated temperature as +100° C., can be employed, but in general a temperature −between 35° and 70° C. gives a favorable result to the polymerization reaction.

The polymerization reaction may be carried out in the absence of a solvent, for example, in liquefied monomers according to the present invention. Inactive reaction medium can be used in conducting the polymerization. The ordinary hydrocarbon compounds or halogenated hydrocarbon compounds are suitable as the inactive reaction medium. For example, the inactive reaction medium includes propane, butane, pentane, hexane, heptane, octane, petroleum ether, ligroin or other petroleum solvent mixture, benzene, toluene, xylene, cyclohexane, methylcyclohexane, methylene dichloride, ethylene dichloride, trichloroethane, tetrachloroethylene, butyl chloride, chlorobenzene, and bromobenzene.

After the polymerization reaction has been completed, the after treatment is carried out according to the ordinary procedure, whereby the resulting polymer can be purified and recovered. The ordinary after treatment includes water treatment, steam treatment, alcohol treatment, alcohol-hydrochloric acid treatment, aqueous hydrochloric acid treatment, alkali treatment, aqueous emulsifier solution treatment, chelating agent treatment, or any other after treatment used in the polymerization based on the Ziegler-Natta catalyst. Or, the resulting solid polymer may be collected and recovered without any of these after treatments, for example, by salting-out or direct removal of the solvent. Further, a stabilizer or other additive can be added to the polymer during or after these treatment.

The copolymers of the present invention are suitable as elastomers when they contain 10–60 mole percent of propylene, 90–40 mole percent of ethylene, and substantially exo-type 5-alkyl-2-norbornene and has faster sulfur curable properties than a copolymer produced by using endo-type or endo- and exo-type 5-alkenyl-2-norbornene as a third component.

The present invention is more concretely explained hereunder, referring to examples, but the present invention is not limited to these examples.

EXAMPLE 1

One liter of heptane was placed in a separable flask having a capacity of 2 liters, and a gaseous mixture of 40 percent by mole of ethylene and 60 percent by mole of propylene, and hydrogen were led to the flask held in a thermostat at 30° C. for 40 minutes at rates of 10Nliter/minute and 2Nliter/minute respectively. The inside of the flask was saturated with these gases. Then, 2 millimoles of exo-type 5-isopropenyl-2-norbornene, 1.25 millimole of ethylaluminum sesquichloride, and 0.125 millimole of vanadyl trichloride were placed in the flask. Polymerization was conducted with stirring while passing said gas streams through the flask. After 5 minutes from the placement of vanadyl trichloride in the flask, 1 millimole of exo-type 5-isopropenyl-2-norbornene was further added to the flask. After 10 minutes, 2 millimoles of exo-type 5-isopropenyl-2-norbornene, 1.25 millimole of ethylaluminum sesquichloride, and 0.125 millimole of vanadyl trichloride were further added to the flask.

The polymerization was conducted until 35 minutes, while repeating such successive additions at the same time interval, and further continued until 45 minutes. Total 5-isopropenyl-2-norbornene added during that period of time amounted to 12 millimoles, total ethylaluminum sesquichloride 5 millimoles, and total vanadyl trichloride 0.5 millimole.

After 45 minutes, 30 ml of methanol containing 2,6-di-t-butyl-p-cresol was added to the polymerization system to interrupt the polymerization reaction. Further, the copolymer solution was washed with a small amount of methanol, and then placed into a large amount of methanol, whereby 35.1 g of copolymer was obtained.

The intrinsic viscosity of the thus obtained copolymer measured in a xylene solution at 70° C. was 1.40 dl/g, and the propylene content of the copolymer determined by an infrared method was 34.5 percent by mole. The iodine number of the copolymer was 10.3.

The rubber obtained by press vulcanization at 160° C. for 20 minutes according to the following formula had a tensile strength of 193 kg/cm², extensibility of 340 percent and $M_{300}$ (modulus at 300 percent) of 172 kg/cm².

The sulfur curing rate determined from a change in torque of a rheometer was 16.1 kg/cm.min.

| | |
|---|---|
| Copolymer | 100 parts |
| β-Phenylnaphthylamine | 1 part |
| Stearic acid | 1 part |
| Zinc white | 5 parts |
| HAF Black | 50 parts |
| Sulfur | 1.5 parts |
| Tetramethylthiuram sulfide | 1.5 parts |
| Macaptobenzothiazole | 0.5 part |

On the other hand, 37.5 g of a copolymer having an intrinsic viscosity of 1.57 dl/g, propylene content of 35.9 percent by mole and iodine number of 14.4 was obtained using endo-type 5-isopropenyl-2-norbornene at the same conditions. The sulfur curing rate of the copolymer was 4.5 kg/cm min. and the rubber prepared from such copolymer had a tensile strength of 116 kg/cm² and extensibility of 300 percent.

EXAMPLE 2

Into a glass reactor having a capacity of 2 liters was placed 700 ml of n-heptane, and then a gaseous mixture of 30 percent by mole of ethylene and 70 percent by mole of propylene was led to the reactor while keeping the reactor temperature at −10° C.

Added thereto were 10 millimoles of exo-type 5-isopropenyl-2-norbornene, 10 millimoles of trihexylaluminum and 4 millimoles of titanium tetrachloride, and polymerization was conducted for 30 minutes, whereby 28.1 g of copolymer having an iodine number of 11.7 was obtained after the same treatment as in Example 1.

EXAMPLE 3

Added to the same flask as used in Example 1, which contained 1 liter of tetrachloroethylene, were 12 millimoles of exo-type 5-(2'-butenyl)-2-norbornene, 4 millimoles of diethylaluminum chloride and 0.4 millimole of triethyl orthovanadate in this order under stirring while continuously leading a gaseous mixture of 30 percent by mole of ethylene and 70 percent by mole of propylene at a rate of 10 N liter/minute at 30° C., and the polymerization was conducted for 20 minutes, whereby 26.3 g of copolymer having an intrinsic viscosity of 1.55 dl/g and iodine number of 12.9 was obtained after the same treatment as in Example 1.

What we claim is:

1. A linear, amorphous, solid terpolymer consisting essentially of from 90 to 40 mole % of ethylene, 10 to 60 mole % of propylene and 0.1 to 20 mole % of exo- 5-alkenyl-2-norbornene.

2. A method for preparing a linear copolymer consisting of substantially exo- 5-alkenyl-2-norbornene and at least one member selected from the group consisting of ethylene and α-olefin having three to 20 carbon atoms, which comprises contacting substantially exo- 5-alkenyl-2-norbornene compound and at least one member selected from the group consisting of ethylene and α-olefin having three to 20 carbon atoms with a catalyst consisting essentially of (1) an organoaluminum compound having a general formula, $AlR_nX_{3-n}$, wherein R represents an ordinary hydrocarbon residual group, X represents a halogen atom and $n$ represents a number of from 1 to 3, and (2) at least one member selected from the group consisting of vanadium compound and titanium compound, both said vanadium compounds and titanium compounds having at least trivalencies.

3. A method according to claim 2, wherein the exo- 5-alkenyl-2-norbornene is exo- 5-isopropenyl-2-norbornene, exo- 5-isopropenyl-6-methyl-2-norbornene, exo- 5-vinyl-2-norbornene, exo- 5-allyl-2-norbornene, exo- 5-(1'-propenyl)-2-norbornene, or exo- 5-(1'-butenyl)-2-norbornene.

4. A method according to claim 2, wherein the α-olefin is propylene, butene-1, pentene-1, 3-methyl-butene-1, hexene-1, 3-methyl-pentene-1, 4-methyl-pentene-1, heptene-1, 4-methyl-hexene-1, 5-methyl-hexene-1, 4,4-dimethyl-pentene-1, octene-1, 4-ethyl-hexene-1, 4-methyl-heptene-1, 5-methyl-heptene-1, 4,4-dimethyl-hexene-1, 6-methyl-heptene-1, 5,6,6-trimethyl-heptene-1, decene-1, 2-ethyl-hexene-1, vinylcyclopentane, or vinylcyclohexane.

5. A method according to claim 2, wherein the organoaluminum compound is methylaluminum dichloride, ethylaluminum dichloride, isobutylaluminum dichloride, ethylaluminum dibromide, allylaluminum dichloride, vinylaluminum dichloride, ethylaluminum sesquichloride, methylaluminum sesquichloride, methylaluminum sesquibromide, ethylaluminum sesquiiodide, isobutylaluminum sesquichloride, hexylaluminum sesquichloride, cyclohexylaluminum sesquichloride, diethylaluminum chloride, diethylaluminum bromide, dipropylaluminum chloride, didodecylaluminum chloride, diethylaluminum fluoride, ethylphenylaluminum chloride, trimethylaluminum, triethylaluminum, tripropylaluminum, triisobutylaluminum, trihexylaluminum, tridecylaluminum, or a mixture of the above-enumerated compounds or a mixture of the above-enumerated compound with aluminum halide.

6. A method according to claim 2, wherein the vanadium compound is vanadium tetrachloride, vanadium trichloride, vanadyl trichloride, vanadyl tribromide, vanadyl dichloride, vanadium triacetylacetonate, vanadyl chloride diacetylacetonate, vanadyl dichloride monoacetylacetonate, vanadyl diacetylacetonate, vanadyl bisbenzoylacetonate, dicyclopentadienyl-vanadium dichloride, triethyl orthovanadate, di-n-butoxyvanadyl chloride, ethoxyvanadyl dichloride, n-butoxyvanadyl dichloride, n-hexyloxyvanadyl dichloride, or cyclohexyloxyvanadyl dichloride.

7. A method according to claim 2, wherein the titanium compound is titanium tetrachloride, titanium trichloride, dicyclopentadienyltitanium dichloride, di-n-butoxytitanium dichloride, isopropoxytitanium trichloride, orthotitanic acid tetraethyl ester or bis[titanium tris-acetylacetonate] hexachlorotitanium.

8. A method according to claim 2, wherein amines, cyclic nitrogen compounds, acid amides, ethers, esters, ketones, aldehydes, compounds of such group Vb elements of Periodic Table as phosphorus, arsenic, antimony, and bismuth, various chelating agents, halogen, sulfur, metal halides, oxygen, nitro compounds, nitroso compounds, organic nitrates, nitrites, N-oxide compounds, p-oxide compounds, azo compounds, organic sulfides, disulfides, quinones, acid halides, or hydrogen are added as third component to the catalyst.

9. A method according to claim 2, wherein the catalyst consists essentially of the organoaluminum compound and at least one member selected from group consisting the vanadium compound and titanium compound in a ratio of 1:1 through 10,000:1.

10. A method according to claim 2, wherein 0.1 to 1,000 millimoles/liter of the exo- 5-alkenyl-2-norbornene compound and at least one member selected from the group consisting of ethylene and α-olefin are contacted with the catalyst consisting of 0.1 to 100 millimoles/liter of organoaluminum compound and 0.01 to 50 millimoles of at least one member selected from the group consisting of vanadium compound and titanium compound in the presence of an inactive reaction medium.

11. A method according to claim 2, wherein the copolymerization is carried out in propane, butane, pentane, hexane, heptane, octane, petroleum ether, ligroin or other petroleum solvent mixture, benzene, toluene, xylene, cyclohexane, methylcyclohexane, methylene dichloride, ethylene dichloride, trichloroethane, tetrachloroethylene, butyl chloride, chlorobenzene, or bromobenzene.

12. A method according to claim 2, wherein the copolymerization is conducted at a temperature of from $-78°$ to $100°$ C. under a pressure condition ranging from a vacuum to $100 \text{ kg/cm}^2$.

* * * * *